United States Patent
Holland et al.

(10) Patent No.: US 10,437,074 B2
(45) Date of Patent: Oct. 8, 2019

(54) SYSTEMS, DEVICES, AND METHODS FOR BEAM COMBINING IN LASER PROJECTORS

(71) Applicant: North Inc., Kitchener (CA)

(72) Inventors: Lloyd Frederick Holland, Kitchener (CA); Joshua Moore, Elora (CA)

(73) Assignee: North Inc., Kitchener, On (CA)

( * ) Notice: Subject to any disclaimer, the term of this patent is extended or adjusted under 35 U.S.C. 154(b) by 0 days.

(21) Appl. No.: 15/852,282

(22) Filed: Dec. 22, 2017

(65) Prior Publication Data
US 2018/0210213 A1    Jul. 26, 2018

Related U.S. Application Data

(60) Provisional application No. 62/450,218, filed on Jan. 25, 2017.

(51) Int. Cl.
*G02B 27/14*    (2006.01)
*G02B 27/10*    (2006.01)
(Continued)

(52) U.S. Cl.
CPC ....... *G02B 27/141* (2013.01); *G02B 27/0172* (2013.01); *G02B 27/104* (2013.01);
(Continued)

(58) Field of Classification Search
CPC .......................... G02B 27/145; G02B 27/1006; G02B 27/123; G02B 27/149; G02B 27/283;
(Continued)

(56) References Cited

U.S. PATENT DOCUMENTS 3,408,133 A    10/1968 Lee
3,712,716 A    1/1973 Cornsweet et al.
(Continued)

FOREIGN PATENT DOCUMENTS

JP    61-198892 A    9/1986
JP    10-319240 A    12/1998
(Continued)

OTHER PUBLICATIONS

Amitai, "P-27: A Two-dimensional Aperture Expander for Ultra-Compact, High-Performance Head-Worn Displays," *SID Symposium Digest of Technical Papers*, vol. 36, No. 1 (2005), pp. 360-363.
(Continued)

*Primary Examiner* — William R Alexander
*Assistant Examiner* — Balram T Parbadia
(74) *Attorney, Agent, or Firm* — Thomas Mahon

(57) ABSTRACT

Systems, devices, and methods for beam combining within laser projectors are described. A laser projector includes first, second, and third laser diodes to generate red, green, and blue laser light respectively, a controllable scan mirror, and a heterogeneous beam splitter system. The red, green, and blue laser light have distinct maximum powers. The heterogeneous beam splitter system splits at least one of the red, green, and blue laser light and combines respective first portions of all three into an aggregate beam. Second portions of laser light are excluded from the aggregate beam. At the maximum power of each laser light the aggregate beam is white as defined by a target white point. The heterogeneous beam splitter system directs the aggregate beam towards the controllable scan mirror which scans the beam onto a projection surface. Decreasing the power of the laser light post-generation provides a larger range of aggregate beam colors.

8 Claims, 3 Drawing Sheets

(51) Int. Cl.
*G02B 27/01* (2006.01)
*H04N 9/31* (2006.01)

(52) U.S. Cl.
CPC ......... *G02B 27/108* (2013.01); *H04N 9/3129* (2013.01); *H04N 9/3161* (2013.01); *H04N 9/3164* (2013.01); *H04N 9/3182* (2013.01); *G02B 2027/0114* (2013.01); *G02B 2027/0178* (2013.01)

(58) Field of Classification Search
CPC .... G02B 27/14; H04N 9/3105; H04N 9/3129; H04N 9/3173; G03B 21/005
See application file for complete search history.

(56) References Cited

U.S. PATENT DOCUMENTS

| | | | |
|---|---|---|---|
| 4,978,213 A | 12/1990 | El Hage | |
| 5,103,323 A | 4/1992 | Magarinos et al. | |
| 5,231,674 A | 7/1993 | Cleveland et al. | |
| 5,467,104 A | 11/1995 | Furness, III et al. | |
| 5,589,956 A | 12/1996 | Morishima et al. | |
| 5,596,339 A | 1/1997 | Furness, III et al. | |
| 5,742,421 A | 4/1998 | Wells et al. | |
| 6,008,781 A | 12/1999 | Furness, III et al. | |
| 6,027,216 A | 2/2000 | Guyton et al. | |
| 6,184,847 B1 | 2/2001 | Fateh et al. | |
| 6,204,829 B1 | 3/2001 | Tidwell | |
| 6,236,476 B1 | 5/2001 | Son et al. | |
| 6,317,103 B1 | 11/2001 | Furness, III et al. | |
| 6,353,503 B1 | 3/2002 | Spitzer et al. | |
| 6,377,277 B1 | 4/2002 | Yamamoto | |
| 6,639,570 B2 | 10/2003 | Furness, III et al. | |
| 6,972,734 B1 | 12/2005 | Ohshima et al. | |
| 6,995,917 B1* | 2/2006 | Sampsell | G02B 27/123 348/E5.141 |
| 7,473,888 B2 | 1/2009 | Wine et al. | |
| 7,640,007 B2 | 12/2009 | Chen et al. | |
| 7,684,105 B2 | 3/2010 | Lamontagne et al. | |
| 7,747,113 B2 | 6/2010 | Mukawa et al. | |
| 7,773,111 B2 | 8/2010 | Cleveland et al. | |
| 7,850,306 B2 | 12/2010 | Uusitalo et al. | |
| 7,925,100 B2 | 4/2011 | Howell et al. | |
| 7,927,522 B2 | 4/2011 | Hsu | |
| 8,120,828 B2 | 2/2012 | Schwerdtner | |
| 8,179,604 B1 | 5/2012 | Prada Gomez et al. | |
| 8,188,937 B1 | 5/2012 | Amafuji et al. | |
| 8,355,671 B2 | 1/2013 | Kramer et al. | |
| 8,560,976 B1 | 10/2013 | Kim | |
| 8,634,119 B2 | 1/2014 | Bablumyan et al. | |
| 8,666,212 B1 | 3/2014 | Amirparviz | |
| 8,704,882 B2 | 4/2014 | Turner | |
| 8,922,481 B1 | 12/2014 | Kauffmann et al. | |
| 8,922,898 B2 | 12/2014 | Legerton et al. | |
| 8,970,571 B1 | 3/2015 | Wong et al. | |
| 8,971,023 B2 | 3/2015 | Olsson et al. | |
| 9,086,687 B2 | 7/2015 | Park et al. | |
| 9,135,708 B2 | 9/2015 | Ebisawa | |
| 9,477,079 B2 | 10/2016 | Bailey et al. | |
| 9,766,449 B2 | 9/2017 | Bailey et al. | |
| 2001/0033402 A1 | 10/2001 | Popovich | |
| 2002/0003627 A1 | 1/2002 | Rieder | |
| 2002/0007118 A1 | 1/2002 | Adachi et al. | |
| 2002/0030636 A1 | 3/2002 | Richards | |
| 2002/0093701 A1 | 7/2002 | Zhang et al. | |
| 2002/0120916 A1 | 8/2002 | Snider, Jr. | |
| 2003/0048421 A1* | 3/2003 | Du | H04N 9/3105 353/31 |
| 2004/0174287 A1 | 9/2004 | Deak | |
| 2005/0012715 A1 | 1/2005 | Ford | |
| 2006/0238707 A1 | 10/2006 | Elvesjo et al. | |
| 2007/0078308 A1 | 4/2007 | Daly | |
| 2007/0132785 A1 | 6/2007 | Ebersole, Jr. et al. | |
| 2007/0273798 A1* | 11/2007 | Silverstein | G02B 13/22 348/752 |
| 2009/0040523 A1* | 2/2009 | Brukilacchio | A61B 1/0653 356/432 |
| 2009/0109241 A1 | 4/2009 | Tsujimoto | |
| 2009/0179824 A1 | 7/2009 | Tsujimoto et al. | |
| 2009/0207464 A1 | 8/2009 | Wiltshire et al. | |
| 2009/0258669 A1 | 10/2009 | Nie et al. | |
| 2009/0322653 A1 | 12/2009 | Putilin et al. | |
| 2010/0053555 A1 | 3/2010 | Enriquez et al. | |
| 2010/0060551 A1 | 3/2010 | Sugiyama et al. | |
| 2010/0142015 A1 | 6/2010 | Kuwahara et al. | |
| 2010/0149073 A1 | 6/2010 | Chaum et al. | |
| 2010/0150415 A1 | 6/2010 | Atkinson et al. | |
| 2010/0201894 A1* | 8/2010 | Nakayama | G09G 3/3433 348/745 |
| 2010/0239776 A1 | 9/2010 | Yajima et al. | |
| 2012/0002256 A1 | 1/2012 | Lacoste et al. | |
| 2012/0139817 A1 | 6/2012 | Freeman | |
| 2012/0169752 A1 | 7/2012 | Kurozuka | |
| 2012/0182309 A1 | 7/2012 | Griffin et al. | |
| 2012/0188158 A1 | 7/2012 | Tan et al. | |
| 2012/0249797 A1 | 10/2012 | Haddick et al. | |
| 2012/0290401 A1 | 11/2012 | Neven | |
| 2012/0302289 A1 | 11/2012 | Kang | |
| 2013/0009853 A1 | 1/2013 | Hesselink et al. | |
| 2013/0016292 A1 | 1/2013 | Miao et al. | |
| 2013/0016413 A1 | 1/2013 | Saeedi et al. | |
| 2013/0088413 A1 | 4/2013 | Raffle et al. | |
| 2013/0135722 A1 | 5/2013 | Yokoyama | |
| 2013/0165813 A1 | 6/2013 | Chang et al. | |
| 2013/0169560 A1 | 7/2013 | Cederlund et al. | |
| 2013/0198694 A1 | 8/2013 | Rahman et al. | |
| 2013/0215235 A1 | 8/2013 | Russell | |
| 2013/0222384 A1 | 8/2013 | Futterer | |
| 2013/0265437 A1 | 10/2013 | Thörn et al. | |
| 2013/0285901 A1 | 10/2013 | Lee et al. | |
| 2013/0300652 A1 | 11/2013 | Raffle et al. | |
| 2013/0332196 A1 | 12/2013 | Pinsker | |
| 2013/0335302 A1 | 12/2013 | Crane et al. | |
| 2014/0045547 A1 | 2/2014 | Singamsetty et al. | |
| 2014/0125715 A1* | 5/2014 | Nishino | G09G 5/10 345/691 |
| 2014/0125760 A1 | 5/2014 | Au et al. | |
| 2014/0198034 A1 | 7/2014 | Bailey et al. | |
| 2014/0198035 A1 | 7/2014 | Bailey et al. | |
| 2014/0202643 A1 | 7/2014 | Hikmet et al. | |
| 2014/0204455 A1 | 7/2014 | Popovich et al. | |
| 2014/0204465 A1 | 7/2014 | Yamaguchi | |
| 2014/0226193 A1 | 8/2014 | Sun | |
| 2014/0232651 A1 | 8/2014 | Kress et al. | |
| 2014/0285429 A1 | 9/2014 | Simmons | |
| 2014/0368896 A1 | 12/2014 | Nakazono et al. | |
| 2015/0036221 A1 | 2/2015 | Stephenson | |
| 2015/0156716 A1 | 6/2015 | Raffle et al. | |
| 2015/0205126 A1 | 7/2015 | Schowengerdt | |
| 2015/0205134 A1 | 7/2015 | Bailey et al. | |
| 2015/0268821 A1 | 9/2015 | Ramsby et al. | |
| 2015/0325202 A1 | 11/2015 | Lake et al. | |
| 2015/0362734 A1 | 12/2015 | Moser et al. | |
| 2015/0378162 A1 | 12/2015 | Bailey et al. | |
| 2016/0033771 A1 | 2/2016 | Tremblay et al. | |
| 2016/0202081 A1 | 7/2016 | Debieuvre et al. | |
| 2016/0238845 A1 | 8/2016 | Alexander et al. | |
| 2016/0274365 A1 | 9/2016 | Bailey et al. | |
| 2016/0274758 A1 | 9/2016 | Bailey | |
| 2016/0327796 A1 | 11/2016 | Bailey et al. | |
| 2016/0327797 A1 | 11/2016 | Bailey et al. | |
| 2016/0349514 A1 | 12/2016 | Alexander et al. | |
| 2016/0349515 A1 | 12/2016 | Alexander et al. | |
| 2016/0349516 A1 | 12/2016 | Alexander et al. | |
| 2016/0377865 A1 | 12/2016 | Alexander et al. | |
| 2016/0377866 A1 | 12/2016 | Alexander et al. | |
| 2017/0068095 A1 | 3/2017 | Holland et al. | |
| 2017/0097753 A1 | 4/2017 | Bailey et al. | |
| 2017/0115483 A1 | 4/2017 | Aleem et al. | |
| 2017/0153701 A1 | 6/2017 | Mahon et al. | |
| 2017/0205876 A1 | 7/2017 | Vidal et al. | |
| 2017/0212290 A1 | 7/2017 | Alexander et al. | |
| 2017/0212349 A1 | 7/2017 | Bailey et al. | |
| 2017/0219829 A1 | 8/2017 | Bailey | |

(56) References Cited

U.S. PATENT DOCUMENTS

| | | | |
|---|---|---|---|
| 2017/0299956 | A1 | 10/2017 | Holland et al. |
| 2017/0343796 | A1 | 11/2017 | Bailey et al. |
| 2017/0343797 | A1 | 11/2017 | Bailey et al. |
| 2018/0007255 | A1 | 1/2018 | Tang |

FOREIGN PATENT DOCUMENTS

| | | |
|---|---|---|
| JP | 2013-127489 A | 6/2013 |
| JP | 2013-160905 A | 8/2013 |
| KR | 10-2004-0006609 A | 1/2004 |
| WO | 2014/155288 A2 | 10/2014 |
| WO | 2015/123775 A1 | 8/2015 |

OTHER PUBLICATIONS

Ayras et al., "Exit pupil expander with a large field of view based on diffractive optics," *Journal of the SID*, vol. 17, No. 8 (2009), pp. 659-664.

Chellappan et al., "Laser-based display: a review," *Applied Optics*, vol. 49, No. 25 (2010), pp. 79-98.

Cui et al., "Diffraction from angular multiplexing slanted volume hologram gratings," *Optik*, vol. 116 (2005), pp. 118-122.

Curatu et al., "Dual Purpose Lens for an Eye-tracked Projection Head-Mounted Display," *International Optical Design Conference 2006*, SPIE-OSA, vol. 6342 (2007), pp. 63420X-1-63420X-7.

Curatu et al., "Projection-based head-mounted display with eye-tracking capabilities," *Proc. of SPIE*, vol. 5875 (2005), pp. 58750J-1-58750J-9.

Essex, "Tutorial on Optomechanical Beam Steering Mechanisms," College of Optical Sciences, University of Arizona, 2006, 8 pages.

Fernandez et al., "Optimization of a thick polyvinyl alcohol-acrylamide photopolymer for data storage using a combination of angular and peristrophic holographic multiplexing," *Applied Optics*, vol. 45, No. 29 (2006), pp. 7661-7666.

Hainich et al., "Chapter 10: Near-Eye Displays," in: *Displays—Fundamentals & Applications*, 2011, pp. 439-503.

Hornstein et al., "Maradin's Micro-Mirror—System Level Synchronization Notes," *SID 2012 Digest* (2012), pp. 981-984.

International Search Report and Written Opinion, dated Apr. 25, 2017, for International Application No. PCT/US2016/067246, 10 pages.

International Search Report and Written Opinion, dated Dec. 8, 2016, for International Application No. PCT/US2016/050225, 15 pages.

International Search Report and Written Opinion, dated Jan. 18, 2017, for International Application No. PCT/US2016/054852, 12 pages.

International Search Report and Written Opinion, dated Jun. 8, 2016, for International Application No. PCT/US2016/018293, 17 pages.

International Search Report and Written Opinion, dated Jun. 8, 2016, for International Application No. PCT/US2016/018298, 14 pages.

International Search Report and Written Opinion, dated Jun. 8, 2016, for International Application No. PCT/US2016/018299, 12 pages.

International Search Report and Written Opinion, dated Oct. 13, 2017, for International Application No. PCT/US2017/040323, 16 pages.

International Search Report and Written Opinion, dated Sep. 28, 2017, for International Application No. PCT/US2017/027479, 13 pages.

Itoh et al., "Interaction-free calibration for optical see-through head-mounted displays based on 3D eye localization," *2014 IEEE Symposium on 3D User Interfaces* (3DUI), (2014), pp. 75-82.

Janssen, "Radio Frequency (RF)" 2013, retrieved from https://web.archive.org/web/20130726153946/https://www.techopedia.com/definition/5083/radio-frequency-rf, retrieved on Jul. 12, 2017, 2 pages.

Kessler, "Optics of Near to Eye Displays (NEDs)," *Oasis 2013*, Tel Aviv, Israel, Feb. 19, 2013, 37 pages.

Kress et al., "A review of head-mounted displays (HMD) technologies and applications for consumer electronics," *Proc. of SPIE*, vol. 8720 (2013), pp. 87200A-1-87200A-13.

Kress et al., "Diffractive and Holographic Optics as Optical Combiners in Head Mounted Displays," *Proceedings of the 2013 ACM Conference on Pervasive and Ubiquitous Computing Adjunct Publication*, Zurich, Switzerland, Sep. 8-12, 2013, pp. 1479-1482.

Kress, "Optical architectures for see-through wearable displays," *Bay Area—SID Seminar*, Bay Area, Apr. 30, 2014, 156 pages.

Levola, "7.1: Invited Paper: Novel Diffractive Optical Components for Near to Eye Displays," *SID Symposium Digest of Technical Papers*, vol. 37, No. 1 (2006), pp. 64-67.

Liao et al., "The Evolution of MEMS Displays," *IEEE Transcations on Industrial Electronics*, vol. 56, No. 4 (2009), pp. 1057-1065.

Lippert, "Chapter 6: Display Devices: RSD (Retinal Scanning Display)," in: *The Avionics Handbook*, 2001, 8 pages.

Majaranta et al., "Chapter 3: Eye-Tracking and Eye-Based Human-Computer Interaction," in *Advances in Physiological Computing*, 2014, pp. 39-65.

Merriam-Webster, "Radio Frequencies" retrieved from https://www.merriam-webster.com/table/collegiate/radiofre.htm, retrieved on Jul. 12, 2017, 2 pages.

Schowengerdt et al., "Stereoscopic retinal scanning laser display with integrated focus cues for ocular accommodation," *Proc. of SPIE-IS&T Electronic Imaging*, vol. 5291 (2004), pp. 366-376.

Silverman et al., "58.5L: Late-News Paper: Engineering a Retinal Scanning Laser Display with Integrated Accommodative Depth Cues," *SID 03 Digest*, (2003), pp. 1538-1541.

Takatsuka et al., "Retinal projection display using diffractive optical element," *Tenth International Conference on Intelligent Information Hiding and Multimedia Signal Processing*, IEEE, (2014), pp. 403-406.

Urey et al., "Optical performance requirements for MEMS-scanner based microdisplays," *Conf. on MOEMS and Miniaturized Systems*, SPIE, vol. 4178 (2000), pp. 176-185.

Urey, "Diffractive exit-pupil expander for display applications," *Applied Optics*, vol. 40, No. 32 (2001), pp. 5840-5851.

Viirre et al., "The Virtual Retina Display: A New Technology for Virtual Reality and Augmented Vision in Medicine," *Proc. of Medicine Meets Virtual Reality* (1998), pp. 252-257.

\* cited by examiner

SYSTEMS, DEVICES, AND METHODS FOR BEAM COMBINING IN LASER PROJECTORS

TECHNICAL FIELD

The present systems, devices, and methods generally relate to beam combining and particularly relate to beam combining within laser projectors in wearable heads-up displays.

BACKGROUND

Description of the Related Art

Laser Projectors

A projector is an optical device that projects or shines a pattern of light onto another object (e.g., onto a surface of another object, such as onto a projection screen) in order to display an image or video on that other object. A projector necessarily includes a light source, and a laser projector is a projector for which the light source comprises at least one laser. The at least one laser is temporally modulated to provide a pattern of laser light and usually at least one controllable scan mirror is used to spatially distribute the modulated pattern of laser light over a two-dimensional area of another object. The spatial distribution of the modulated pattern of laser light produces an image at or on the other object. In conventional laser projectors, the at least one controllable scan mirror may include: a single digital micromirror (e.g., a microelectromechanical system ("MEMS") based digital micromirror) that is controllably rotatable or deformable in two dimensions, or two digital micromirrors that are each controllably rotatable or deformable about a respective dimension, or a digital light processing ("DLP") chip comprising an array of digital micromirrors.

In a conventional laser projector comprising a RGB laser module with a red laser diode, a green laser diode, and a blue laser diode, the individual red laser beam, green laser beam, and blue laser beam may be combined into an aggregate laser beam such that each laser beam impinges on the at least one controllable scan mirror with substantially the same spot size (the two dimensional area of the cross section of the laser beam at any point along the length of the beam) and with substantially the same rate of convergence (so that all laser beams will continue to have substantially the same spot size as they propagate away from the laser projector towards, e.g., a projection screen). The laser light outputs of red, green, and blue laser diodes can be modulated to produce different colors of aggregate laser beam. Specific aggregate beam colors correspond to specific power ratios between the red, green, and blue laser light, however, these ratios can be difficult to achieve with currently available laser diodes. There is a need in the art for a system that manipulates laser light to achieve a wide range of colors.

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date employ large display components and, as a result, most wearable heads-up displays presented to date are considerably bulkier and less stylish than conventional eyeglass frames.

A challenge in the design of wearable heads-up displays is to minimize the bulk of the face-worn apparatus will still providing displayed content with sufficient visual quality. There is a need in the art for wearable heads-up displays of more aesthetically-appealing design that are capable of providing high-quality images to the user without limiting the user's ability to see their external environment.

BRIEF SUMMARY

A laser projector may be summarized as including: a laser module comprising a first laser diode to generate laser light in a first waveband having up to a first power; a second laser diode to generate laser light in a second waveband having up to a second power; and a third laser diode to generate laser light in a third waveband having up to a third power, wherein the first waveband, the second waveband, and the third waveband are all distinct from one another with no overlap therebetween, and wherein the first power, the second power, and the third power are all distinct from one another; at least one controllable scan mirror; and a heterogeneous beam splitter system positioned in between the laser module and the at least one controllable scan mirror, the heterogeneous beam splitter system comprising a plurality of beam splitters to combine respective first portions of the laser light in the first waveband, the laser light in the second waveband, and the laser light in the third waveband together into an aggregate beam having up to a fourth power and to exclude respective second portions of at least one of the laser light in the first waveband, the laser light in the second waveband, and the laser light in the third waveband from the aggregate beam to provide the aggregate beam with a white point color when the fourth power of the aggregate beam is at a maximum value. The laser projector may further include at least one light absorption surface, wherein the beam splitters of the heterogeneous beam splitter system are positioned and oriented to: direct the aggregate beam towards the at least one controllable scan mirror; and route a second portion of the laser light in the first waveband and a second portion of the laser light in the second waveband both towards the at least one light absorption surface. At least a subset of the beam splitters of the heterogeneous beam splitter system may be positioned and oriented to route a second portion of the laser light in the third waveband towards the at least one light absorption surface.

The laser projector may further include a plurality of photodiodes, wherein the beam splitters of the heterogeneous beam splitter system are positioned and oriented to: route a second portion of the laser light in the first waveband towards a first photodiode; and route a second portion of the laser light in the second waveband towards a second photodiode. At least a subset of the beam splitters of the heterogeneous beam splitter system may be positioned and oriented to route a second portion of the laser light in the third waveband towards a third photodiode.

The plurality of beam splitters may include a plurality of dichroic reflective elements. Each dichroic reflective element in the plurality of dichroic reflective elements may be oriented parallel to the other dichroic reflective elements in the plurality of dichroic reflective elements at an at least approximately 45° angle relative to an optical path of the aggregate beam.

The first laser diode may be a red laser diode to generate red laser light, the second laser diode may be a green laser diode to generate green laser light, and the third laser diode may be a blue laser diode to generate blue laser light.

A wearable heads-up display may be summarized as including: a support structure that in use is worn on the head of user; a transparent combiner that positions within a field of view of the user when the support structure is worn on the head of the user; a laser projector carried by the support structure, the laser projector comprising: a laser module including: a first laser diode to generate laser light in a first waveband having up to a first power; a second laser diode to generate laser light in a second waveband having up to a second power; and a third laser diode to generate laser light in a third waveband having up to a third power, wherein the first waveband, the second waveband, and the third waveband are all distinct from one another with no overlap therebetween, and wherein the first power, the second power, and the third power are all distinct from one another; at least one controllable scan mirror; and a heterogeneous beam splitter system positioned in between the laser module and the at least one controllable scan mirror, the heterogeneous beam splitter system comprising a plurality of beam splitters to combine respective first portions of the laser light in the first waveband, the laser light in the second waveband, and the laser light in the third waveband together into an aggregate beam having up to a fourth power and to exclude respective second portions of at least one of the laser light in the first waveband, the laser light in the second waveband, and the laser light in the third waveband from the aggregate beam to provide the aggregate beam with a white point color when the fourth power of the aggregate beam is at a maximum value. The WHUD may further include at least one light absorption surface, wherein the beam splitters of the heterogeneous beam splitter system are positioned and oriented to: direct the aggregate beam towards the at least one controllable scan mirror; and route a second portion of the laser light in the first waveband and a second portion of the laser light in the second waveband both towards the at least one light absorption surface. At least a subset of the beam splitters of the heterogeneous beam splitter system may be positioned and oriented to route a second portion of the laser light in the third waveband towards the at least one light absorption surface.

The WHUD may further include a plurality of photodiodes, wherein the beam splitters of the heterogeneous beam splitter system are positioned and oriented to: route a second portion of the laser light in the first waveband towards a first photodiode; and route a second portion of the laser light in the second waveband towards a second photodiode. At least a subset of the beam splitters of the heterogeneous beam splitter system are positioned and oriented to route a second portion of the laser light in the third waveband towards a third photodiode.

The plurality of beam splitters may include a plurality of dichroic reflective elements. Each dichroic reflective element in the plurality of dichroic reflective elements may be oriented parallel to the other dichroic reflective elements in the plurality of dichroic reflective elements at an at least approximately 45° angle relative to an optical path of the aggregate beam.

The first laser diode of the WHUD may be a red laser diode to generate red laser light, the second laser diode may be a green laser diode to generate green laser light, and the third laser diode may be a blue laser diode to generate blue laser light.

A method of operating a laser projector, wherein the laser projector comprises a first laser diode, a second laser diode, a third laser diode, at least one controllable scan mirror, and a heterogeneous beam splitter system including a plurality of beam splitters, may be summarized as including: generating laser light in a first waveband having up to a first power by the first laser diode; generating laser light in a second waveband having up to a second power by the second laser diode; generating laser light in a third waveband having up to a third power by the third laser diode, wherein the first waveband, the second waveband, and the third waveband are all distinct from one another with no overlap therebetween, and wherein the first power, the second power, and the third power are all distinct from one another; combining, by the beam splitters of the heterogeneous beam splitter system, respective first portions of the laser light in the first waveband, the laser light in the second waveband, and the laser light in the third waveband into an aggregate beam having up to a fourth power; routing, by the beam splitters of the heterogeneous beam splitter system, respective second portions of at least one of the laser light in the first waveband, the laser light in the second waveband, and the laser light in the third waveband to exclude the second portions from the aggregate beam to provide the aggregate beam with a white point color when aggregate beam has the fourth power; directing the aggregate beam towards the at least one controllable scan mirror by the plurality of beam splitters; and directing the aggregate beam towards a projection surface by the at least one controllable scan mirror. The laser projector may further include at least one light absorption surface, and routing, by the beam splitters of the heterogeneous beam splitter system, respective second portions of at least one of the laser light in the first waveband, the laser light in the second waveband, and the laser light in the third waveband to exclude the second portions from the aggregate beam may further include: routing, by at least a first subset of the beam splitters in the heterogeneous beam splitter system, a second portion of laser light in the first waveband towards at least one light absorption surface; and routing, by at least a second subset of the beam splitters in the heterogeneous beam splitter system, a second portion of laser light in the second waveband towards at least one light absorption surface. The method of operating the laser projector may further include: routing by at least a third subset of the beam splitters of the heterogeneous beam splitter system, a second portion of laser light in the third waveband towards at least one light absorption surface.

The laser projector may further include a plurality of photodiodes, and the method of operating the laser projector may further include: routing, by at least a first subset of the beam splitters in the heterogeneous beam splitter system, a second portion of laser light in the first waveband towards a first photodiode; and routing, by at least a second subset of the beam splitters in the heterogeneous beam splitter system, a second portion of laser light in the second waveband towards a second photodiode. The method of operating the laser projector may further include: routing, by at least a third subset of the beam splitters in the heterogeneous beam splitter system, a second portion of laser light in the third waveband towards a third photodiode.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
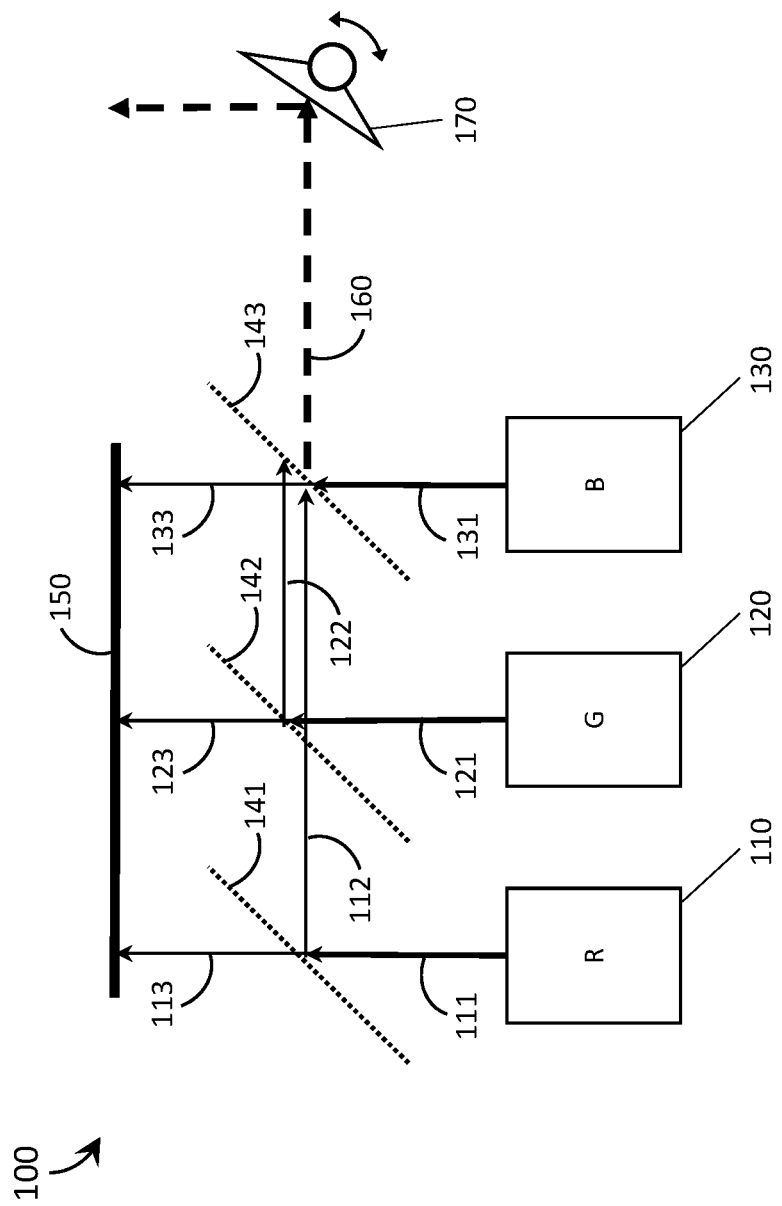
FIG. 1 is a schematic diagram of a laser projector with a heterogeneous beam splitter system in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for beam combining in laser projectors and are particularly well-suited for use in wearable heads-up displays.

Throughout this specification the terms "white point", "target white point", "white point chromaticity" or variations thereof are used. A white point refers to the chromaticity of a white object for a given illuminant. An illuminant is a theoretical light source representing light conditions such as a tungsten lamp or daylight in a certain location. The white point of a specific illuminant can be represented by x and y coordinates within CIE (International Commission on Illumination) 1931 Color Space. A standard illuminant is Illuminant D65, a daylight illuminant which has a color temperature of 6504K and represents midday light in Western/Northern Europe. If the chromaticity of a modulatable red light source (e.g., an LED or a laser diode), a modulatable green light source, and a modulatable blue light source are known, the ratio of red laser light to green laser light to blue laser light and the luminance of the laser light required to achieve an Illuminant D65 (or any other defined illuminant) white aggregate light can be calculated.

Throughout this specification a "white aggregate beam", an aggregate beam described as white, or variations thereof refer to an aggregate beam having both a white chromaticity as defined by a target white point (e.g., Illuminant D65) and a luminance wherein a human eye would perceive the aggregate beam as white light.

In a laser projector employing red, green, and blue laser diodes to create an aggregate beam, color mixing is dependent on two factors: the ratio of the power of the red laser light to the power of the green laser light to the power of the blue laser light, and the cumulative power of the combined red, green, and blue laser light. The ratio between the different colors of light determines the chromaticity of the aggregate beam while the cumulative weighted power determines the luminance of the aggregate beam. Light at different wavelengths but with the same power are perceived by the human eye to have different brightness; a phenomenon defined by the photopic curve. Therefore, the cumulative power of the aggregate beam must be weighted according to the photopic curve to define the luminance. If the R:G:B ratio is maintained but the cumulative weighted power changes the aggregate beam will have the same chromaticity but a different luminance. In the reverse situation in which the combined weighted power is maintained but the ratio between the light changes the aggregate beam will have a different chromaticity and the same luminance. Any two aggregate beams with different chromaticity and/or luminance are defined as having a different "color". In RGB laser projectors, laser diodes often have 256 levels (0-255) of modulation resulting in over sixteen million ($256^3$) possible colors.

Laser diodes only lase when a minimum level of power is reached. That is, although a laser diode may have a range of output powers from zero to a peak value, coherent light is only produced above a certain value, for example 20% of the maximum power. In an ideal laser projector the aggregate beam created at the maximum powers of the red laser diode, the green laser diode, and the blue laser diode would result in a white aggregate beam, however, this is not possible with currently available laser diodes, and when multiple laser diodes with distinct power profiles are used to form an aggregate beam at least one of the laser diodes will be used inefficiently. For example, in a laser projector, a red laser diode may have a maximum output power of 9.0 mW, a green laser diode a maximum output power of 4.0 mW, a blue laser diode a maximum output power of 6.0 mW and the red:green:blue ratio required to create an aggregate beam having a target white point chromaticity may be 3:2:1. This ratio is exemplary and the actual ratio would depend on the chromaticity of the light generated by each laser diode. For the comfort and/or safety of a user the maximum desired power of an aggregate beam may be 9.0 mW (value for exemplary purposes only). Under these conditions a white aggregate beam occurs at a red laser diode output power of 4.5 mW, a green laser diode output power of 3.0 mW, and a blue laser diode output power of 1.5 mW. In this example, the red laser diode has only reached 30% of its maximum power, the green laser diode has only reached 75% of its maximum power, and the blue laser diode has only reached 25% of its maximum power. If the laser diodes only lase above 20% power output then 87.5% of the modulatable range of the laser light output of the red laser diode is lost, 31.25% of the modulatable range of the laser light output of the green laser diode is lost, and 93.75% of the modulatable range of the laser light output of the blue laser diode is lost. This loss of modulatable range limits the range of colors of aggregate beam that can be produced. A heterogeneous beam splitter system (discussed in detail below) will split the red laser light, green laser light, and blue laser light heterogeneously, such that only a portion of each respective color of light is combined into the aggregate beam to create a white aggregate beam at the maximum power output of each laser diode. Under the above exemplary conditions, the red laser light would be split into a first portion comprising 50% of the red laser light and a second portion comprising 50% of the red laser light, the green laser light would be split into a first portion comprising 75% of the green laser light and a second portion comprising 25% of the green laser light, and the blue laser light would be split into a first portion comprising 25% of the blue laser light and a second portion comprising 75% of the blue laser light. The first portions of red, green, and blue laser light would be combined to create the aggregate beam. This allows for each laser diode to be modulated from 0% to 100% of the available output power to maintain a larger range of colors. By using a heterogeneous beam splitter system to both dim the red laser light, green laser light, and blue laser light and combine the red laser light, green laser light, and blue laser light into an aggregate beam, instead of dimming and combining the laser light by separate systems, the bulk of the laser projector can be minimized. This is particularly beneficial in wearable heads-up displays.

FIG. 1 is a schematic diagram of a laser projector 100 with a heterogeneous beam splitter system in accordance with the present systems, devices, and methods. Laser projector 100 includes laser diodes 110, 120, and 130, a controllable scan mirror 170, a light absorption surface 150, and a heterogeneous beam splitter system comprising beam splitters 141, 142, and 143. Laser diode 110 is a red laser diode to generate red laser light in a first waveband comprising red wavelengths. Laser diode 120 is a green laser diode to generate green laser light in a second waveband comprising green wavelengths. Laser diode 130 is a blue laser diode to generate blue laser light in a third waveband comprising blue wavelengths. Laser projector 100 may include a processor communicatively coupled to laser diodes 110, 120, and 130, and a non-transitory processor-readable storage medium communicatively coupled to the processor, wherein the processor executes instructions and/or data from the non-transitory processor-readable storage medium to modulate the generation of laser light by laser diodes 110, 120, and 130. Beam splitters 141, 142, and 143 may be dichroic reflective elements and each dichroic reflective element may be oriented parallel to the other dichroic reflective elements and on an at least 45° angle (+/−5%) relative to an optical path of the aggregate beam. Beam splitters 141, 142, and 143 may be exposed to air or may be embedded in or integrated into a solid volume of optically transparent material. In FIG. 1, the order of the laser diodes is red, then green, then blue but this may be different in other implementations.

Laser projector 100 operates as follows. Red laser diode 110 generates red laser light 111 having up to a first power. The power output of red laser diode 110 is controllably variable. Red laser light 111 is incident on beam splitter 141. Beam splitter 141 splits red laser light 111 into a first portion of red laser light 112 and a second portion of red laser light 113, wherein the cumulative power of first portion of red laser light 112 and second portion of red laser light 113 is approximately equal to the output power of red laser light 111. That is the cumulative power of first portion of red laser light 112 and second portion of red laser light 113 is within 5% of the power of the red laser light 111. Those of skill in the art will appreciate that small amounts of light may be absorbed or otherwise lost at intervening optical elements (e.g., collimating lenses) or at the beam splitters themselves. Red laser light 112 is reflected by beam splitter 141 towards and through beam splitters 142 and 143. Red laser light 113 passes through beam splitter 141 and is absorbed by light absorption surface 150. Green laser diode 120 generates green laser light 121 having up to a second power. The power output of green laser diode 120 is controllably variable. Green laser light 121 is incident on beam splitter 142. Beam splitter 142 splits green laser light 121 into a first portion of green laser light 122 and a second portion of green laser light 123, wherein the cumulative power of first portion of green laser light 122 and second portion of green laser light 123 is approximately equal to the output power of green laser light 121 (within 5%). Green laser light 122 is reflected by beam splitter 142 towards and through beam splitter 143. In this way red laser light 112 and green laser light 122 are combined. Green laser light 123 passes through beam splitter 142 and is absorbed by light absorption surface 150. Blue laser diode 130 generates blue laser light 131 having up to a third power. The power output of the blue laser diode 130 is controllably variable. Blue laser light 131 is incident on beam splitter 143. Beam splitter 143 splits blue laser light 131 into a first portion of blue laser light 132 and a second portion of blue laser light 133, wherein the cumulative power of first portion of blue laser light 132 and second portion of blue laser light 133 is approximately equal to the output power of blue laser light 131 (within 5%). Blue laser light 132 is reflected by beam splitter 143. Blue laser light 133 passes through beam splitter 143 and is absorbed by light absorption surface 150. Red laser light 112, green laser light 122, and blue laser light 132 are combined, by beam splitter 143, into an aggregate beam 160 having up to a fourth power. Red laser light 113, green laser light 123, and blue laser light 133 are excluded from aggregate beam 160. The heterogeneous beam splitter system is oriented to direct aggregate beam 160 towards controllable scan mirror 170. Controllable scan mirror 170 directs aggregate beam 160 towards a projection surface. In this specification "projection surface" may mean any surface that the aggregate beam can be projected onto such that the image being created is visible to a user, for example a screen or a wall, but may also include an intermediate element such as a holographic optical element within a wearable heads-up display which redirects the light to an eye of the user. Controllable scan mirror 170 may be a single digital micromirror (e.g., a microelectromechanical system ("MEMS") based digital micromirror) that is controllably rotatable or deformable in two dimensions, or may include two digital micromirrors that are each controllably rotatable or deformable about a respective dimension, or a digital light processing ("DLP") chip comprising an array of digital micromirrors. Light absorption surface 150 may be a single surface oriented to absorb second portions of laser light 113, 123, and 133 or may be multiple surfaces each positioned and oriented to absorb one or more of second portions of laser light 113, 123, and 133. Light absorption surface 150 may be a volume of material placed within laser projector 100 to absorb light, alternatively a surface of laser projector 100 in a position to receive second portions of laser light 113, 123, and 133 may be coated with a light absorbing material such as a "super-black" material, or a surface of laser projector 100 in a position to receive second portion of laser light 113, 123, and 133 may be surface treated (e.g. anodized) to absorb light. Laser projector 100 may also include at least one element that acts as a heat sink to limit any increase in heat of the light absorption surface or laser projector 100. In another implementation, laser projector 100 may include photodiodes positioned and oriented to receive second portions of laser light 113, 123, and 133. The photodiodes may be used to monitor the power level of second portions of laser light 113, 123, and 133 and may act as part of a safety circuit to ensure safe levels of power output from each of laser diodes 110, 120, and 130. Laser projector 100 may also include photodiodes that measure the power level of aggregate beam 160.

As the power of laser light 111, 121, or 131 generated by respective laser diode 110, 120, or 130 changes, the ratio of first portion of laser light 112, 122, or 132 to respective second portion of laser light 113, 123, or 133 does not change. For example, beam splitter 141 may split red laser light 111 3:1 into first portion 112 and second portion 113; therefore, at 10.0 mW of power for red laser light 111, first portion 112 would have a power of approximately 7.5 mW and second portion 113 would have a power of approximately 2.5 mW, while at 4.0 mW of power for red laser light 111 first portion 112 would have a power of 3.0 mW and second portion 113 would have a power of 1.0 mW. Each of beam splitter 141, 142, and 143 splits respective laser light 111, 121, or 131 by the amount appropriate for the characteristics (i.e., chromaticity and maximum output power) of respective laser diode 110, 120, or 130. The amount of light that beam splitter 141 apportions into first portion of red laser light 111, beam splitter 142 apportions into first portion of green laser light 121, and beam splitter 143 apportions into first portion of blue laser light 131 is such that when red laser diode 110 generates light at the first power, green laser diode 120 generates light at the second power, and blue laser diode 130 generates light at the third power, the power of aggregate beam 160 is equal to the fourth power. At the fourth power aggregate beam 160 is white (as defined by a target white point, e.g., Illuminant D65 white point, see above). That is, at the maximum output power for red laser diode 110, green laser diode 120, and blue laser diode 130, beam splitters 141, 142, and 143 split and combine red laser light 111, green laser light 121, and blue laser light 131 such that resulting aggregate beam 160 has a ratio of red laser light to green laser light to blue laser light and a power that results in a chromaticity and luminance that is perceived by a human eye as white (as defined by the target white point).

In another implementation, the laser light generated by one or more of the laser diodes may not require splitting to achieve the correct ratio between the laser light generated by the laser diodes. In yet another implementation, a laser light beam may be split by more than one beam splitter. For example, if the desired amount of red laser light 111 in aggregate beam 160 was 20%, each of beam splitter 141, 142, and 143, may split the red laser light incident thereon to combine 20% of red laser light into aggregate beam 160. For example, beam splitter 141 may split red laser light 111 into a 50% first portion 112 and a 50% second portion 113. Beam splitter 142 may then split first portion 112 into a 50% third portion and a 50% fourth portion and direct the third portion towards beam splitter 143 and reflect the fourth portion towards light absorption surface 150. Beam splitter 143 may then split the third portion into an 80% fifth portion and a 20% sixth portion and direct the fifth portion towards controllable scan mirror 170 as part of aggregate beam 160 and reflect the sixth portion towards light absorption surface 150. The fifth portion is 20% of initial red laser light 111. When the laser diodes and the beam splitters are oriented as in FIG. 1, light from the first laser diode (furthest from the controllable scan mirror, red in FIG. 1) can be split three times, light from the second laser diode (middle, green in FIG. 1) can be split twice, and light from the third laser diode (closest to the controllable scan mirror, blue in FIG. 1) can be split once.

Figure 2:
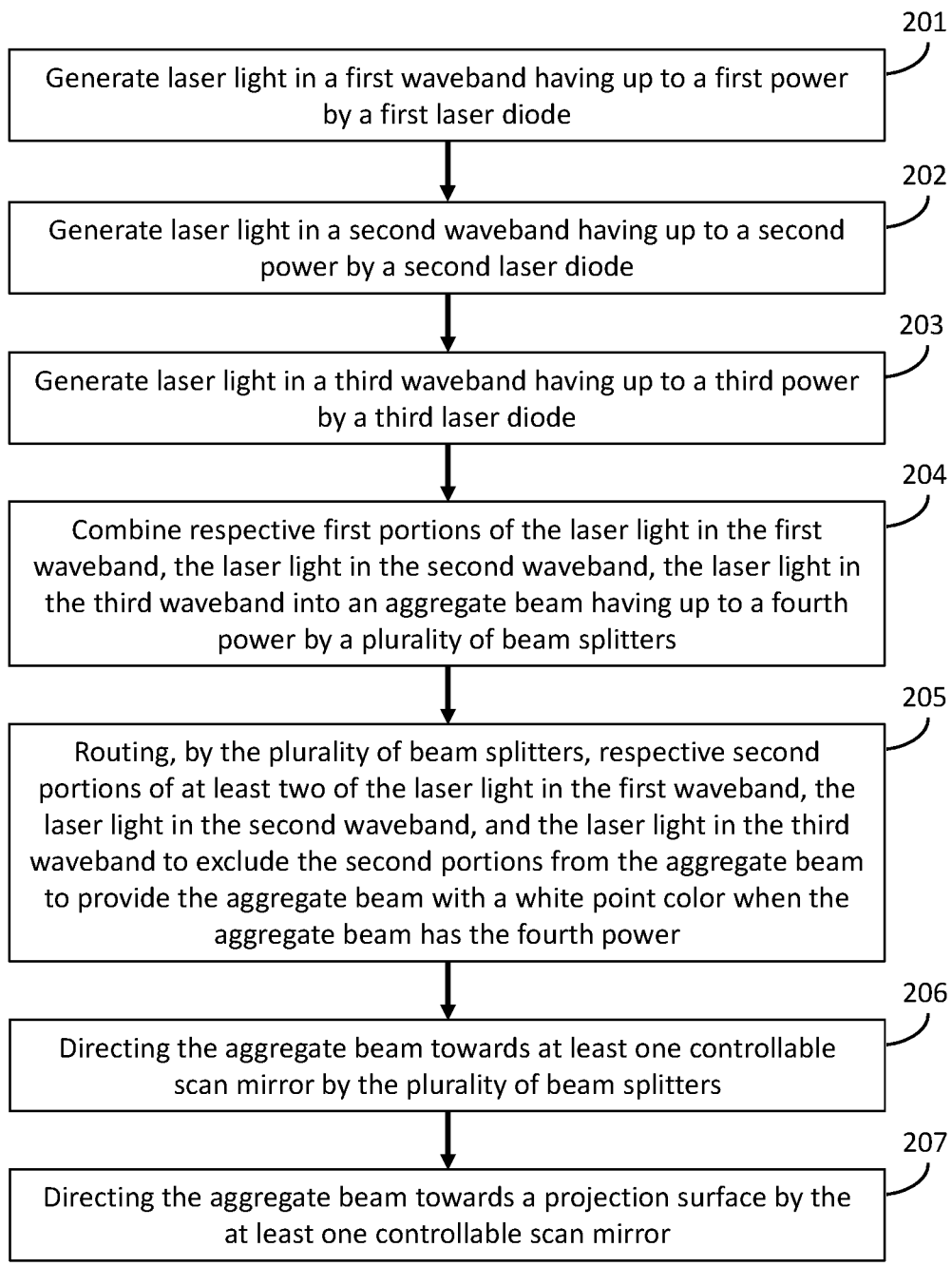
FIG. 2 is a flow diagram of a method of operating a laser projector with a heterogeneous beam splitter system in accordance with the present systems, device, and methods.

FIG. 2 is a flow-diagram showing a method 200 of operating a laser projector with a heterogeneous beam splitting system in accordance with the present systems, devices, and methods. The laser projector may be substantially similar to laser projector 100 of FIG. 1 and generally includes a first laser diode, a second laser diode, a third laser diode, at least one controllable scan mirror, and a heterogeneous beam splitter system comprising a plurality of beam splitters. Method 200 includes acts 201, 202, 203, 204, 205, 206, and 207 though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

At 201, the first laser diode generates laser light in a first waveband having up to a first power. The first laser diode may be a red laser diode to generate red laser light in a first waveband comprising red wavelengths.

At 202, the second laser diode generates laser light in a second waveband having up to a second power, wherein the second power is distinct from the first power. The second laser diode may be a green laser diode to generate green laser light in a second waveband comprising green wavelengths. The laser At 203, the third laser diode generates laser light in a third waveband having up to a third power, wherein the third power is distinct from the first power and the second power. The third laser diode may be a blue laser diode to generate blue laser light in a third waveband comprising red wavelengths.

At 204, the plurality of beam splitters combine respective first portions of the laser light in the first waveband, the light in the second waveband, and the light in the third waveband into an aggregate beam having up to a fourth power. That is, the plurality of beam splitters combine red laser light (first waveband), green laser light (second waveband), and blue laser light (third waveband) into an aggregate beam. At least one of the respective first portions of red laser light, green laser light, or blue laser light are portions of light that are split from the respective red laser light, green laser light, or blue laser light by the plurality beam splitters. If only one of the red laser light, green laser light, and blue laser light is split by the plurality of beam splitters then the second and third first portions will be the total light generated by the other two laser diodes. If only two of the red laser light, green laser light, and blue laser light are split by the plurality of beam splitters then the third first portion (the light that was not split) will be the total light generated by the respective laser diode.

At 205, the plurality of beam splitters route respective second portions of at least one of the laser light in the first waveband, the laser light in the second waveband, and the laser light in the third waveband to exclude the second portions from the aggregate beam to provide the aggregate beam with a target white point color when the aggregate beam has the fourth power. The plurality of beam splitters may be dichroic reflective elements and each dichroic reflective element may be oriented parallel to the other dichroic reflective elements and on an at least 45° angle (+/−5%) relative to an optical path of the aggregate beam. As mentioned in act 204, at least one of the red laser light, the green laser light, and the blue laser light are split by the plurality of beam splitters. Therefore, there are respective second portions for at least one of the red laser light, the green laser light, and the blue laser light. The second portions are routed by the beam splitters away from the path of the first portions and are excluded from the aggregate beam. The second portions of light may be routed towards at least one light absorption surface. The at least one light absorption surface may be a single surface oriented to absorb the second portions of laser light or may be multiple surfaces each positioned and oriented to absorb at least one of the second portions. The at least one light absorption surface may be a volume of material placed within the laser projector to absorb light, alternatively a surface of the laser projector in a position to receive the second portions of laser light may be coated with a light absorbing material such as a "superblack" material, or a surface of the laser projector in a position to receive the second portions of laser light may be surface-treated (e.g. anodized) to absorb light. Additionally or alternatively, photodiodes may be positioned and oriented to receive the second portions of laser light. The ratio of each first portion of laser light that is combined into the aggregate beam to each respective second portion of laser light that is directed away from the path of the aggregate beam for each of the red laser light, the green laser light, and the blue laser light is such that when the red laser light is generated at the first power, the green laser light is generated at the second power, and the blue laser light is generated at the third power, the aggregate beam is at the fourth power and is white.

At 206, the plurality of beam splitters directs the aggregate beam towards at least one controllable scan mirror. The plurality of beam splitters is oriented such that the aggregate beam is directed towards, and is incident on, the at least one controllable scan mirror. The at least one controllable scan mirror may include: a single digital micromirror (e.g., a microelectromechanical system ("MEMS") based digital micromirror) that is controllably rotatable or deformable in two dimensions, or two digital micromirrors that are each controllably rotatable or deformable about a respective dimension, or a digital light processing ("DLP") chip comprising an array of digital micromirrors.

At 207, the at least one controllable scan mirror directs the aggregate beam towards a projection surface. The at least one controllable scan mirror projects the aggregate beam onto a projection surface by scanning (e.g. raster scanning). The projection surface may be any surface onto which the aggregate beam can be scanned, for example a screen or a wall, but may be an intermediate element such as a holographic optical element within a wearable heads-up display which redirects the light to an eye of the user.

Figure 3:
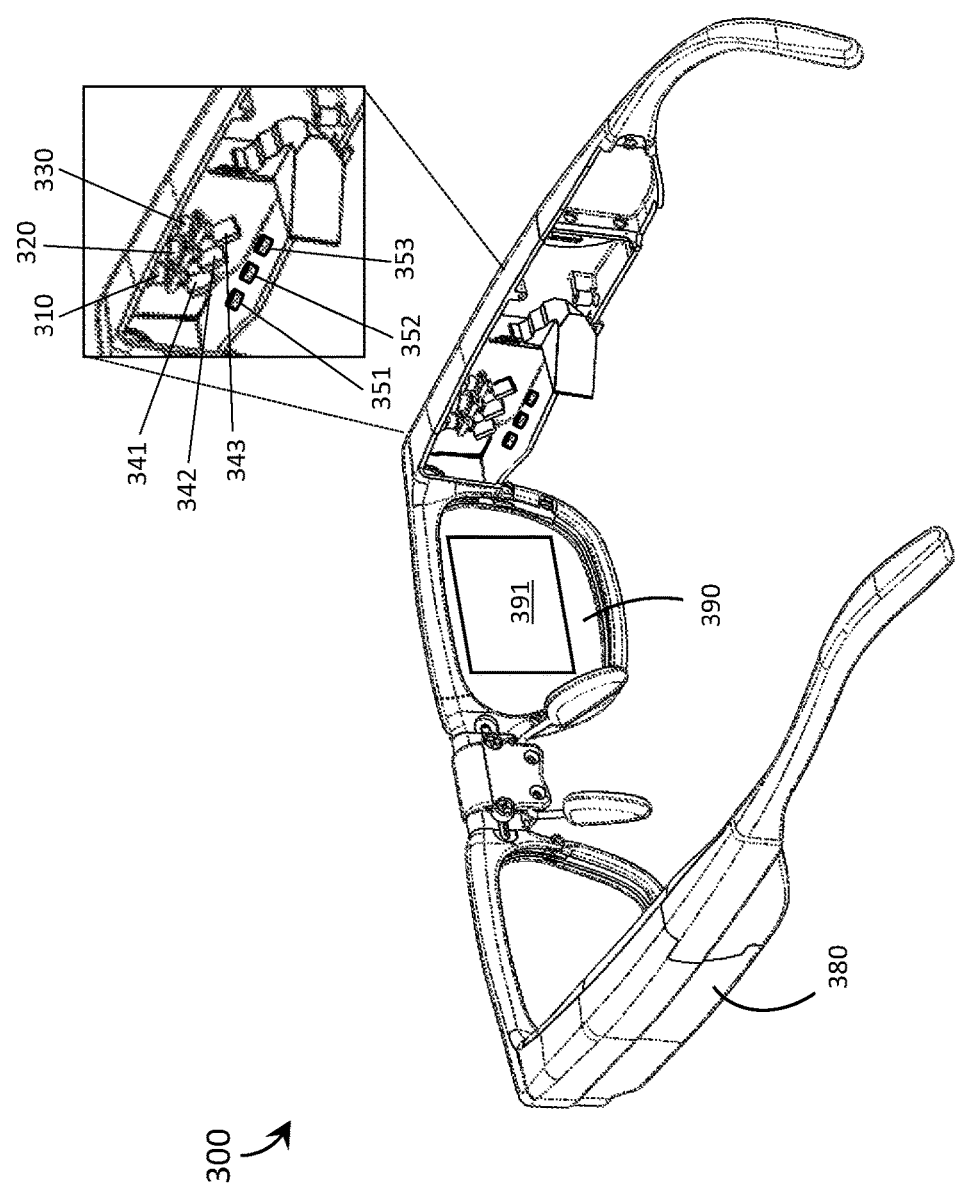
FIG. 3 is an isometric view of a wearable heads-up display with a laser projector including a heterogeneous beam splitter system, with a detailed view of a portion thereto, in accordance with the present systems devices and methods.

FIG. 3 is an isometric view of a wearable heads-up display (WHUD) 300 with a laser projector including a heterogeneous beam splitter system, with a detailed view of a portion thereto, in accordance with the present systems, devices, and methods. WHUD 300 includes a support structure 380 having the shape and appearance of eyeglasses, an eyeglass lens 390 carried by the support structure, a transparent combiner 391 carried by eyeglass lens 390, and a laser projector. The laser projector includes a first laser diode 310, a second laser diode 320, a third laser diode 330, at least one controllable scan mirror (not shown), three photodiodes 351, 352, and 353, and a heterogeneous beam splitter system comprising beam splitters 341, 342, and 343. The laser projector in FIG. 3, is similar or identical to laser projector 100 from FIG. 1. Laser diode 310 is a red laser diode to generate red laser light in a first waveband comprising red wavelengths, the red laser light having up to a first power. Laser diode 320 is a green laser diode to generate green laser light in a second waveband comprising green wavelengths, the green laser light having up to a second power. Laser diode 330 is a blue laser diode to generate blue laser light in a third waveband comprising blue wavelengths, the blue laser light having up to a third power. The first power, second power, and third power are all distinct. The plurality of beam splitters may be a plurality of dichroic reflective elements.

WHUD 300 operates as follows. Red laser diode 310 generates red laser light having up to the first power. The red laser light is incident on beam splitter 341 and is split by beam splitter 341 into a first portion of red laser light and a second portion of red laser light. The first portion of red laser light is reflected by beam splitter 341 through beam splitters 342 and 343 towards the at least one controllable scan mirror. The second portion of red laser light passes through beam splitter 341 and is incident on photodiode 351. Green laser diode 320 generates green laser light having up to the second power. The green laser light is incident on beam splitter 342 and is split by beam splitter 342 into a first portion of green laser light and a second portion of green laser light. The first portion of green laser light is reflected by beam splitter 342 through beam splitter 343 towards the at least one controllable scan mirror. The second portion of green laser light passes through beam splitter 342 and is incident on photodiode 352. Blue laser diode 330 generates blue laser light having up to the third power. The blue laser light is incident on beam splitter 343 and is split by beam splitter 343 into a first portion of blue laser light and a second portion of blue laser light. The first portion of blue laser light is reflected by beam splitter 343 towards the at least one controllable scan mirror. The second portion of blue laser light passes through beam splitter 343 and is incident on photodiode 353. In another implementation, the laser projector may not include photodiodes 351, 352, and 352, but may instead include at least one light absorption surface to absorb the second portions of light. In this way, beam splitters 341, 342, and 343 combine the first portion of red laser light, the first portion of green laser light, and the first portion of blue laser light into an aggregate beam having up to a fourth power and direct the aggregate beam towards the at least one controllable scan mirror. At the first power, the second power, and the third power, respectively, of the red laser light, the green laser light, and the blue laser light the aggregate beam is white. Beam splitters 341, 342, and 343 split the red laser light, the blue laser light, and the green laser light into respective first and second portions at a constant ratio independent of the power of the laser light generated by the respective laser diode 310, 320, or 330. The ratio of first portion to second portion may be heterogeneous for the red laser light, the green laser light, and the blue laser light. The fourth power of the aggregate beam is the sum of the maximum power value of the respective first portions of red laser light, green laser light, and blue laser light. The at least one controllable scan mirror directs the aggregate beam towards the transparent combiner and the transparent combiner redirects the aggregate beam towards an eye of a user to create an image visible by the user.

A person of skill in the art will appreciate that some of the elements of the heterogeneous beam splitter system may be carried within or on the solid volume of a monolithic beam combiner such as those described in U.S. Non-Provisional patent application Ser. No. 15/848,265, U.S. Non-Provisional patent application Ser. No. 15/848,388.

A person of skill in the art will appreciate that the various embodiments for beam combining in laser projectors described herein may be applied in non-WHUD applications. For example, the present systems, devices, and methods may be applied in non-wearable heads-up displays and/or in other applications that may or may not include a visible display.

In some implementations, one or more optical fiber(s) may be used to guide light signals along some of the paths illustrated herein.

The WHUDs described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No. 14/155,087, U.S. Non-Provisional patent application Ser. No. 14/155,107, PCT Patent Application PCT/US2014/057029, and/or U.S. Provisional Patent Application Ser. No. 62/236,060, all of which are incorporated by reference herein in their entirety.

Throughout this specification and the appended claims, the term "carries" and variants such as "carried by" or "carrying" are generally used to refer to a physical coupling between two objects. The physical coupling may be direct physical coupling (i.e., with direct physical contact between the two objects) or indirect physical coupling mediated by one or more additional objects. Thus the term carries and variants such as "carried by" are meant to generally encompass all manner of direct and indirect physical coupling.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," "to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: US Patent Application Publication No. US 2015-0378161 A1, U.S. Non-Provisional patent application Ser. No. 15/046,234, US Patent Application Publication No. US 2016-0377865 A1, U.S. Non-Provisional patent application Ser. No. 15/046,254, US Patent Application Publication No. US 2016-0377866 A1, US Patent Application Publication No. US 2016-0238845 A1, U.S. Non-Provisional patent application Ser. No. 15/145,576, US Patent Application Publication No. US 2017-0212349 A1 U.S. Non-Provisional patent application Ser. No. 15/145,609, US Patent Application Publication No. US 2016-0327797 A1, U.S. Non-Provisional patent application Ser. No. 15/145,583, US Patent Application Publication No. US 2016-327796 A1, U.S. Non-Provisional patent application Ser. No. 15/256,148, US Patent Application Publication No. US 2017-0068095 A1, U.S. Non-Provisional patent application Ser. No. 15/167,458, US Patent Application Publication No. US 2016-00349514 A1, U.S. Non-Provisional patent application Ser. No. 15/167,472, US Patent Application Serial No. US 2016-0349515 A1, U.S. Non-Provisional patent application Ser. No. 15/167,484, US Patent Application Publication No. US 2016-0349516 A1, U.S. Provisional Patent Application Ser. No. 62/271,135, U.S. Non-Provisional patent application Ser. No. 15/331,204, US Patent Application Publication No. US 2014-0198034 A1, US Patent Application Publication No. US 2014-0198035 A1, U.S. Non-Provisional patent application Ser. No. 15/282,535, US Patent Application Publication No. 2017-0097753 A1, U.S. Provisional Patent Application Ser. No. 62/268,892, U.S. Non-Provisional patent application Ser. No. 15/331,204, U.S. Provisional Patent Application Ser. No. 62/322,128, U.S. Non-Provisional patent application Ser. No. 15/487,232, U.S. Non-Provisional patent application Ser. No. 15/837,259, U.S. Non-Provisional patent application Ser. No. 15/837,264, U.S. Provisional Patent Application Ser. No. 62/367,501, U.S. Non-Provisional patent application Ser. No. 15/661,415, U.S. Non-Provisional patent application Ser. No. 15/839,058, U.S. Non-Provisional patent application Ser. No. 15/839,102, U.S. Provisional Patent Application Ser. No. 62/420,368, U.S. Non-Provisional patent application Ser. No. 15/809,237, U.S. Non-Provisional patent application Ser. No. 15/809,247, U.S. Provisional Patent Application Ser. No. 62/420,371, U.S. Non-Provisional patent application Ser. No. 15/809,258, U.S. Non-Provisional patent application Ser. No. 15/809,266, U.S. Provisional Patent Application Ser. No. 62/420,380, U.S. Non-Provisional patent application Ser. No. 15/809,629, U.S. Non-Provisional patent application Ser. No. 15/809,632, and U.S. Provisional Patent Application Ser. No. 62/438,725, U.S. Non-Provisional patent application Ser. No. 15/848,265, U.S. Non-Provisional patent application Ser. No. 15/848,388, and U.S. Provisional Patent Application Ser. No. 62/450,218, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable heads-up display (WHUD), comprising:
   a support structure that in use is worn on the head of user;
   a transparent combiner that positions within a field of view of the user when the support structure is worn on the head of the user;
   a laser projector carried by the support structure, the laser projector comprising:
   a laser module comprising:
      a first laser diode to generate laser light in a first waveband having up to a first power $P_1$;
      a second laser diode to generate laser light in a second waveband having up to a second power $P_2$; and
      a third laser diode to generate laser light in a third waveband having up to a third power $P_3$, wherein the first waveband, the second waveband, and the third waveband are all distinct from one another with no overlap therebetween, and wherein the first power $P_1$, the second power $P_2$, and the third power $P_3$ are all distinct from one another to provide an input power ratio $P_1:P_2:P_3$ that does not correspond to a white point color;
   at least one controllable scan mirror; and
   a heterogeneous beam splitter system positioned in between the laser module and the at least one controllable scan mirror, the heterogeneous beam splitter system comprising a plurality of beam splitters to combine respective first portions of the laser light in the first waveband, the laser light in the second waveband, and the laser light in the third waveband together into an aggregate beam having up to a fourth power and to exclude respective second portions of at least one of the laser light in the first waveband, the laser light in the second waveband, and the laser light in the third waveband from the aggregate beam to provide the aggregate beam with an output power ratio $P_1':P_2':P_3'$ that does correspond to a white point color when the fourth power of the aggregate beam is at a maximum value.

2. The WHUD of claim 1, further comprising at least one light absorption surface, wherein the beam splitters of the heterogeneous beam splitter system are positioned and oriented to:
   direct the aggregate beam towards the at least one controllable scan mirror; and route a second portion of the laser light in the first waveband and a second portion of the laser light in the second waveband both towards the at least one light absorption surface.

3. The WHUD of claim 2 wherein at least a subset of the beam splitters of the heterogeneous beam splitter system are positioned and oriented to route a second portion of the laser light in the third waveband towards the at least one light absorption surface.

4. The WHUD of claim 1, further comprising a plurality of photodiodes, wherein the beam splitters of the heterogeneous beam splitter system are positioned and oriented to:
route a second portion of the laser light in the first waveband towards a first photodiode; and
route a second portion of the laser light in the second waveband towards a second photodiode.

5. The WHUD of claim 4 wherein at least a subset of the beam splitters of the heterogeneous beam splitter system are positioned and oriented to route a second portion of the laser light in the third waveband towards a third photodiode.

6. The WHUD of claim 1 wherein the plurality of beam splitters includes a plurality of dichroic reflective elements.

7. The WHUD of claim 6 wherein each dichroic reflective element in the plurality of dichroic reflective elements is oriented parallel to the other dichroic reflective elements in the plurality of dichroic reflective elements at an at least approximately 45° angle relative to an optical path of the aggregate beam.

8. The WHUD of claim 1 wherein the first laser diode is a red laser diode to generate red laser light, the second laser diode is a green laser diode to generate green laser light, and the third laser diode is a blue laser diode to generate blue laser light.

* * * * *